Dec. 14, 1948.　　　A. DYDUSZYNSKI　　　2,456,557
HYDROCARBON CONVERSION
Filed Nov. 12, 1946
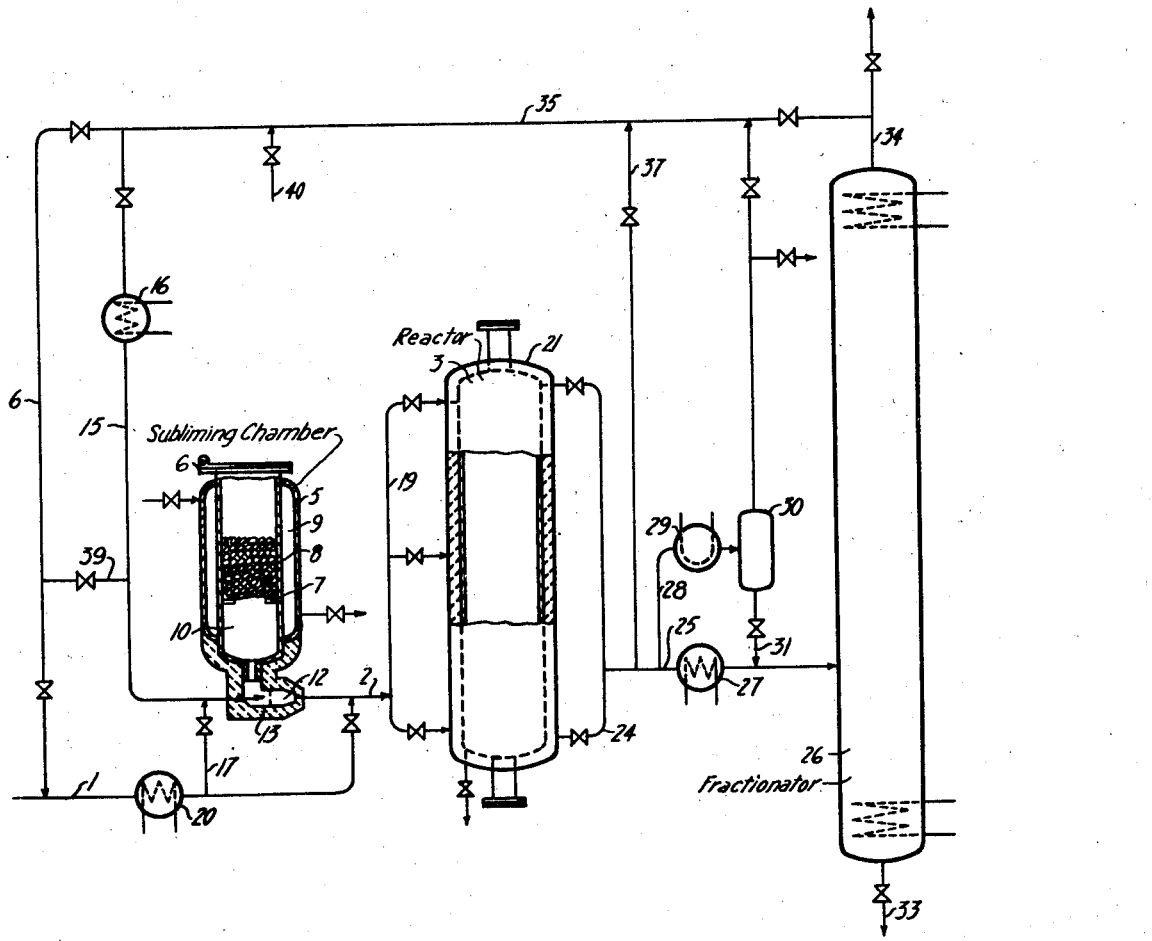
Inventor: Adam Dyduszynski Patented Dec. 14, 1948

2,456,557

UNITED STATES PATENT OFFICE 2,456,557

HYDROCARBON CONVERSION

Adam Dyduszynski, Chester, England, assignor to Shell Development Company, San Francisco, Calif., a corporation of Delaware Application November 12, 1946, Serial No. 709,317
In Great Britain November 12, 1945

5 Claims. (Cl. 260—683.15)

This invention relates to the execution of catalytic reactions with the aid of metal halides of the Friedel-Crafts type possessing substantial volatility under operating conditions. The invention relates more particularly to the execution of catalytic hydrocarbon conversions with the aid of catalysts consisting essentially of aluminum chloride.

Though the metal halides of the Friedel-Crafts type which possess substantial volatility under normal operating conditions, such as, for example, aluminum chloride, are highly effective in their ability to catalyze a wide variety of reactions, their use, as such, by methods disclosed heretofore often involves difficulties detracting materially from efficient practical application. Thus in the execution of hydrocarbon conversions the addition of aluminum chloride in the solid form, whether as a powder or granules, to the reactants not only renders difficult the attainment of that degree of catalyst distribution necessary to obtain efficient conversion and avoid any substantial detrimental effects occasioned by localized catalyst concentration, but also generaly results in the coating of the catalyst with a high boiling, sticky reaction product, thereby rendering unavailable the greater part of the catalyst. Introducing the aluminum chloride in the form of a solution or a paste does not obviate these difficulties, and often increases the problems involved in moving catalyst and resultant sludgy reaction products through the system. The pasage of hydrocarbon reactants in the vapor phase through a bed of aluminum chloride, optionally admixed with support material, though successfully employed in certain processes, such as the isomerization of the less readily degraded paraffinic hydrocarbons, is not applicable to the execution of a number of hydrocarbon conversions because of the inordinate degree of sludging of catalyst encountered therein.

Characteristics of the latter method of operation, seriously detracting from its efficient use in many processes, are the lack of uniformity in the distribution of the catalyst throughout the reaction zone and the inordinately large reaction vessels often required when diluent or support material must be employed. A further difficulty generally inherent in the use of a solid bed of aluminum chloride-containing catalyst is the inability to maintain relatively uniform temperature conditions therein due to the low thermal conductivity of the material constituting the catalyst bed and the localized over-heating usually occasioned by uneven catalyst distribution. These difficulties are particularly pronounced in processes wherein the materials converted comprise highly reactive materials such as, for example, olefinic hydrocarbons, which in the presence of substantial amounts of aluminum chloride readily result in the formation of undesirable, sticky, complex reaction products.

To avoid these difficulties the aluminum chloride has often been employed in a modified form, such as, for example, a combination thereof with a less reactive material capable of combining therewith. Such catalysts, though effective in certain processes, render unavailable the particularly desirable characteristics with respect to catalyst activity peculiar to aluminum chloride per se.

The above difficulties are obviated to at least a substantial degree in the process of the invention by the utilization of the aluminum chloride in a highly active, finely divided form in the reaction zone and by the substantially improved method comprised therein for the introduction of aluminum chloride, per se, in such form into the reaction zone.

In accordance with the present invention the aluminum chloride to be used as catalyst in the execution of the reaction is sublimed into a suitable stream of fluid material and transported in such finely divided sublimed form into the reaction zone. The stream of fluid material employed as the medium for introducing the finely divided, sublimed aluminum chloride into the reaction zone may comprise at least a part of the charge to the system, or recycled material comprising unconverted and/or converted material. A part or all of the fluid stream may comprise material other than the material which is to be converted and which may or may not undergo conversion under the conditions of execution of the reaction. The fluid stream may be in the gaseous or liquid phase, depending upon the nature of the composition thereof as well as the operating conditions employed.

The process of the invention may be applied broadly to the execution of catalytic reactions wherein the catalyst comprises aluminum chloride per se. The process of the invention is applied with advantage to the catalytic conversion of hydrocarbons. In the execution of a catalytic reaction such as, for example, a hydrocarbon conversion, in accordance with the process of the invention, the hydrocarbons to be converted are contacted with aluminum chloride in a finely divided sublimed form in a reaction zone under catalytic conversion conditions. Aluminum chloride in the finely divided, highly active, sublime form is conveyed to the reaction zone from an aluminum chloride sublimation zone within the system. The aluminum chloride sublimation zone may comprise a suitable chamber containing a bed, or pervious container, of solid aluminum chloride. Within the sublimation chamber the aluminum chloride is raised to a temperature sufficiently high to effect sublimation of aluminum chloride. The temperature of sublimation employed may be attained by any suitable means such, for example, as by the use of external heating means as a jacket provided with means for the passage therethrough of a heating medium, such as water or oil heated to a sufficiently high temperature. The sublimation chamber is provided with ejection means enabling the ejection, or withdrawal, of the aluminum chloride in the form of a finely divided sublimate therefrom. The process of the invention is in no wise limited by the nature of the particular ejection means employed. The ejection means employed, however, enable the introduction of the aluminum chloride withdrawn from the subliming chamber into a fluid stream in the form of a sublimate under conditions assuring the passage to and introduction into the reaction zone of the aluminum chloride in the finely divided form of a sublimate. The ejector employed is such as to avoid contact of any substantial amount of fluid carrying medium with unsublimed aluminum chloride in the sublimation zone.

The fluid medium employed in conveying the aluminum chloride in the form of a sublimate from the sublimation zone to the reaction zone may suitably comprise a portion of the charge, or a hydrocarbon stream recycled from within the system. Thus a hydrocarbon stream comprising a portion of the reactor effluence may be introduced into a suitable ejection means associated with the sublimation chamber to result in the withdrawal of sublimed aluminum chloride from the sublimation chamber and its dispersion into the hydrocarbon stream in sublimed form. The fluid hydrocarbon stream introduced into the ejection means and withdrawing sublimed aluminum chloride from the subliming chamber without coming into contact with unsublimed aluminum chloride is at a temperature assuring the maintenance of the aluminum chloride in the finely divided and active form of a sublimate. When required, means are provided for maintaining the hydrocarbon stream entering the ejector associated with the sublimation chamber and passing therefrom to the reaction zone, at sublimation temperature or higher, thereby assuring the maintenance of the aluminum chloride in the finely divided and highly active sublimed state.

Conversion conditions in the reaction zone are maintained by provision of suitable means for the addition or withdrawal of heat therefrom. The presence of the aluminum chloride in the reaction zone in the finely divided sublimed state not only assures uniform and efficient contact of hydrocarbon and catalyst, but also obviates difficulties heretofore encountered with respect to localized overheating due to localized catalyst concentration. Difficulties occasioned by sludging and coating of catalyst are avoided and the problem of conveying the catalyst to the reaction zone and maintaining uniform reaction conditions are substantially simplified.

A further and highly advantageous feature of the invention is the highly active state in which the catalyst enters the reaction zone. This is due not only to its extremely finely divided state and uniformity of distribution, but also to the absence therein of contaminants such as iron and iron-containing impurities generally unavoidably present in aluminum chloride and not readily separable therefrom on a practical scale in conversion processes disclosed heretofore. In the method of the catalyst introduction of the present invention where hydrocarbons do not contact the aluminum chloride prior to sublimation, such impurities are left behind in the residue in the sublimation chamber whence they are eliminated from the system.

The reaction zone employed in the process of the invention may comprise any suitable reactor enabling passage therethrough of the reactants under conversion conditions. Thus the reaction zone may comprise one or more zones of enlarged cross-sectional area such as one or more chambers connected in series or in parallel; it may comprise one or more zones of restricted cross-sectional area such as one or more coils connected in series or in parallel; or it may comprise both a zone of restricted and a zone of enlarged cross-sectional area.

Effluence from the reaction zone is passed therefrom to suitable product separating means effecting the separation of converted from unconverted material and entrained catalyst. A part of the reactor effluence may be passed directly from the reaction zone to the ejector means of the sublimation zone, or a part or all of the hydrocarbons recycled to the ejector of the sublimation zone may emanate from the product separating zone.

Examples of hydrocarbon conversions to which the process of the invention may be applied comprise the cracking of hydrocarbons, such as the cracking of higher boiling hydrocarbons to lower boiling normally liquid hydrocarbons in the motor fuel boiling range; the cracking of normally liquid hydrocarbons to normally gaseous materials; reforming and hydroforming of hydrocarbons to improve the properties thereof as motor fuel; the isomerization of hydrocarbons, such as the treatment of individual paraffins under the isomerizing conditions in the presence of the sublimed aluminum chloride to effect the production of isomeric paraffins of substantially the same molecular weight. Such isomerization processes comprise, for example, the conversion of butane to isobutane; the conversion of pentane to isopentane; normal hexane and branched chain hexanes, heptanes, etc., to branched and more highly branched hexanes, heptanes, etc., respectively. The isomerization of cycloparaffins such as, for example, the conversion of alkyl cyclopentanes, as methylcyclopentane to cyclohexanes, etc., is effected with the aid of aluminum chloride in accordance with the process of the invention. Further examples of hydrocarbon conversions executed in accordance with the invention comprise the alkylation of hydrocarbons, such as the alkylation of a hydrocarbon with an alkylating agent, as the alkylation of isoparaffins with olefins exemplified by the alkylation of isobutane with ethylene, etc., the alkylation of aromatic hydrocarbons, etc.

A particular advantage of the process of the invention resides in its ability to treat unsaturated compounds with aluminum chloride, per se, with substantially improved results. Thus the process of the invention lends itself particularly to the polymerization of olefinic hydrocarbons such as, for example, the conversion of normally gaseous and/or normally liquid olefinic hydrocarbons to higher boiling hydrocarbons in the motor fuel and/or lubricating oil boiling range. The process of the invention thus enables the production with substantial improvement of the high viscosity index lubricating oils resulting from the polymerization of olefinic hydrocarbons such as ethylene and propylene, as well as the higher boiling olefins, in the presence of aluminum chloride.

In order to set forth more fully the nature of the invention it will be described in detail in its application to the polymerization of normally gaseous unsaturated hydrocarbons with reference to the attached drawing wherein the single figure represents a more or less diagrammatical illustration of one form of apparatus suitable for executing the process of the invention.

Hydrocarbons comprising normally gaseous olefinic hydrocarbons such as ethylene and propylene, are taken from an outside source and passed through lines 1 and 2 into a reaction zone such as, for example, chamber 3. Within chamber 3 the olefinic hydrocarbons are contacted at olefin polymerizing conditions with aluminum chloride. The aluminum chloride catalyst emanates from an aluminum chloride sublimation zone comprising, for example, a chamber 5. Solid aluminum chloride is introduced into chamber 5 from an outside source through the closure means 6. A pervious supporting means such as, for example, a fine mesh screen 7 is provided in chamber 5, for support of the solid aluminum chloride. The solid aluminum chloride may be introduced into the chamber 5 in the form of lumps or granules to form a bed of solid aluminum chloride 8. An efficient method of operation comprises the introduction of the aluminum chloride into chamber 5 enclosed in the container or drum in which the anhydrous aluminum chloride is often packed for shipment, the top or bottom of the drum being removed or rendered pervious prior to its introduction into the sublimation zone. Sublimation chamber 5 is provided with suitable heating means such as for example a jacket 9 provided with means for the passage of a heating medium such as, for example, heated water, oil or the like therethrough. Other heating means not shown in the drawing may suitably be resorted to, to aid in effecting the sublimation of aluminum chloride.

The temperature in the sublimation zone is raised sufficiently high to effect the sublimation of the aluminum chloride at a sufficiently rapid rate to supply the proper proportion of aluminum chloride in the reaction zone. The temperature inside chamber 5 will depend to some degree upon the particular operating conditions employed. Thus at atmosphere pressure the maintenance of a temperature of about 177° C. will generally assure adequate sublimation of the aluminum chloride, higher temperatures being employed when resort is had to the use of higher pressures in chamber 5. Aluminum chloride sublimes into space 10 below the bed of solid aluminum chloride.

Chamber 5 is provided with suitable ejecting means in open communication with space 10 of the chamber 5 and represented diagrammatically in the drawing by passage 12 provided with suitable insulating means 13. Within passage 12 constituting the ejector, a jet of fluid material such as, for example, a hydrocarbon stream comprising normally gaseous hydrocarbons emanating from line 15 and flowing into line 2 results in the formation of a sufficiently high differential in pressure between the point of ejection of the gaseous stream into passage 12 and the space 10 in sublimation chamber 5 to result in a continuous withdrawal of aluminum chloride in the finely divided state of sublimation from space 10 into the normally gaseous stream entering line 2.

The gaseous stream entering the passage 12 of the ejector is preferably heated to a temperature at least equal to the sublimation temperature employed by means of suitable heating means such as for example an indirect heat exchanger 16. Line 2, if required, is suitably insulated to aid in maintaining the aluminum chloride in the finely divided sublimed state. If desired hydrocarbon charge to the system may comprise all or a part of the hydrocarbon stream introduced into passage 12 by means of line 15. To this effect a valved line 17 is provided for the passage of olefinic charge from line 1 into line 15.

Hydrocarbon charge and sublimed aluminum chloride enters reaction chamber 3, from line 2, by means of header 18 enabling their introduction into the reaction zone at an upper, intermediate or lower part thereof.

Within reaction chamber 3, the reactants are maintained at olefin polymerizing conditions assuring the conversion of normally gaseous olefins to normally liquid products comprising hydrocarbons in the lubricating oil range. Temperatures in the range of from about 100° C. to about 600° C. may suitably be resorted to at pressures ranging for example from about atmospheric to 120 atmospheres and higher. The particular operating conditions employed will of course vary in accordance with the nature of the olefinic charge. Temperature conditions are maintained within reactor 3 by means of heater 20, insulating means 21, and optionally by additional means for the addition or withdrawal of heat therefrom not shown in the drawing.

The proportion of aluminum chloride introduced into the reaction zone may vary widely within the scope of the ivention and depend to a substantial degree upon the reaction conditions employed. An advantage of the invention resides in the ability to utilize and control smaller amounts of aluminum chloride than required heretofore, as well as the ability to resort to higher temperatures without the formation of substantial amounts of undesirable reaction products. The rate of catalyst introduction into chamber 3 is readily controlled by the temperature maintained in chamber 5 as well as by the rate of flow of the gaseous stream through the passage 12 of the ejector.

The process of the invention thus enables the attainment of substantial improvement, not only with respect to uniformity of catalyst distribution, but also with respect to control of proportion of catalyst to hydrocarbon in the reaction zone.

Effluence from the reaction zone is taken from the upper or lower part of chamber 3 by means of manifold 24 and passes through valved line 25 into a product separating zone. The product separating zone may comprise a fractionator 26. Indirect heat exchanger, or cooling means, 27 is positioned within line 25 to enable the withdrawal of heat from reactor effluence passing therethrough. If desired, reactor effluence may be passed through valved line 28 and cooler 29 into an accumulator 30. From accumulator 30 liquid products may be passed through valved lines 31 and 27 into fractionator 26. Within fractionator 26 there is separated a liquid product, comprising polymers of the olefin charge boiling in the lubricating oil boiling range, from a vapor fraction comprising unconverted hydrocarbons, entrained catalysts and materials lighter boiling than the liquid fraction which may have been formed within the system. The liquid fraction is drawn from fractionator 26 by means of valved line 33 and the vapor fraction is withdrawn therefrom by means of valved line 34. At least a part of the vapor overhead from fractionator 34 is passed from valved line 34 through valved line 35 into line 15 to provide the hydrocarbon stream introduced into ejector passage 12 of the sublimation zone. A part of the recycled stream may be diverted through valved line 36 leading into charge line 1. A part or all of the material recycled through valved line 35 may comprise the vapor and/or gaseous phase separated within accumuator 30 when the latter is employed. If desired, reactor effluence may be passed directly from line 25 by means of valved line 37 into line 35. A valved line 39 is provided enabling the passage of hydrocarbon flowing through valved line 36 into line 15 at a point below heat exchanger 16.

A valved line 40 is provided for the introduction of additional fluid medium capable of functioning as a carrier for the sublimed aluminum chloride such as, for example, an inert, or relatively inert, normally gaseous material such as methane, ethane or the like, or a normally liquid material which is gaseous at the temperature of sublimitation of the aluminum chloride. Such aluminum chloride carrier is introduced into line 35 by means of valved line 40, separated from reaction products with the vapor overhead from fractionator 26 or from accumulator 30 and recycled to ejector 12 of the sublimation zone.

Although the detailed illustrative description of the invention has stressed the execution of a polymerization reaction in the vapor phase, it is to be understood that the invention is in no wise limited to the execution of conversions in the vapor phase. Thus the processes carried out in accordance with the process of the invention may be executed in the vapor or liquid phase or in a mixed phase. The operation, though lending itself advantageously to continuous operation, may be effected in batch or semi-continuous manner. It must be further stressed that the hydrocarbon stream passing through ejector 12 of the sublimation zone may be in the liquid or in the vapor phase. The hydrocarbon charge entering line 2 through valved line 1 need furthermore not necessarily be in the same phase as the stream emanating from ejector passage 12. It is to be stressed, however, that realization of the advantage inherent in the process of the invention necessitates the avoidance of contact of any substantial amount of hydrocarbons with aluminum chloride prior to sublimation of the latter.

The invention claimed is:

1. In a process for the catalytic conversion of hydrocarbons wherein hydrocarbons are contacted with aluminum chloride under conversion conditions in an unpacked reaction chamber, the steps which comprise maintaining a circulating stream of gaseous reactants comprising gaseous hydrocarbons containing sublimed aluminum chloride uniformly dispersed therein in a substantially closed circuit, said circuit comprising said unpacked reaction chamber in communication by means of a restricted zone of fluid flow in a confined stream with an aluminum chloride dispersing zone, continuously subliming solid aluminum chloride out of contact with said hydrocarbons, introducing said sublimed aluminum chloride into said aluminum chloride dispersing zone, continuously circulating effluence from said reaction chamber comprising gaseous hydrocarbons containing sublimed aluminum chloride dispersed therein through said restricted zone of fluid flow and said aluminum chloride dispersing zone back into said reaction chamber, thereby continuously dispersing fresh sublimed aluminum chloride into said circulating stream of reactants, continuously introducing fresh gaseous hydrocarbons to be converted into said circuit, continuously withdrawing a portion of said reactants comprising gaseous hydrocarbons and aluminum chloride from said circuit, and separately removing aluminum chloride and hydrocarbons from said withdrawn portion of reactants.

2. In a process for the catalytic conversion of hydrocarbons wherein hydrocarbons are contacted with aluminum chloride under conversion conditions in an unpacked reaction chamber, the steps which comprise maintaining a circulating stream of reactants comprising gaseous hydrocarbons containing sublimed aluminum chloride uniformly dispersed therein in a substantially closed circuit, said circuit comprising said unpacked reaction chamber in communication by means of a restricted zone of fluid flow in a confined stream with an aluminum chloride dispersing zone, continuously subliming solid aluminum chloride out of contact with said hydrocarbons, introducing said sublimed aluminum chloride into said aluminum chloride dispersing zone, continuously circulating effluence from said reaction chamber comprising gaseous hydrocarbons containing sublimed aluminum chloride dispersed therein through said restricted zone of fluid flow and said aluminum chloride dispersing zone back into said reaction chamber, thereby continuously dispersing fresh sublimed aluminum chloride into said circulating stream of reactants, continuously introducing fresh gaseous hydrocarbons to be converted into said circuit at a point between said reaction chamber and said aluminum chloride dispersing zone, continuously withdrawing a portion of said reactants comprising gaseous hydrocarbons and aluminum chloride from said circuit, and separately removing aluminum chloride and hydrocarbons from said withdrawn portion of reactants.

3. In a process for the catalytic conversion of hydrocarbons wherein hydrocarbons are contacted with aluminum chloride under conversion conditions in an unpacked reaction chamber, the steps which comprise maintaining a circulating stream of reactants comprising gaseous hydrocarbons containing sublimed aluminum chloride uniformly dispersed therein in a substantially closed circuit, said circuit comprising said unpacked reaction chamber in communication by means of a restricted zone of fluid flow in a confined stream with an aluminum chloride dispersing zone, continuously subliming solid aluminum chloride out of contact with said hydrocarbons, introducing said sublimed aluminum chloride into said aluminum chloride dispersing zone, continuously circulating effluence from said reaction chamber comprising gaseous hydrocarbons containing sublimed aluminum chloride dispersed therein through said restricted zone of fluid flow and said aluminum chloride dispersing zone back into said reaction chamber, thereby continuously dispersing fresh sublimed aluminum chloride into said circulating stream of reactants, continuously introducing fresh gaseous hydrocarbons to be converted into said circuit, continuously introducing an inert carrier gas for said aluminum chloride into said circuit, continuously withdrawing a portion of said reactants comprising fluid hydrocarbons and aluminum chloride from said circuit, and separately removing aluminum chloride and hydrocarbons from said withdrawn portion of reactants.

4. In a process for the catalytic vapor phase polymerization of unsaturated hydrocarbons comprising olefins wherein said hydrocarbons are contacted with aluminum chloride at olefin polymerizing conditions in an unpacked reaction chamber the steps which comprise maintaining a circulating stream of vaporous reactants comprising said hydrocarbons containing sublimed aluminum chloride uniformly dispersed therein in a substantially closed circuit, said circuit comprising said unpacked reaction chamber in communication by means of a restricted zone of fluid flow in a confined stream with an aluminum chloride dispersing zone, continuously subliming solid aluminum chloride out of contact with said hydrocarbons, introducing said sublimed aluminum chloride into said aluminum chloride dispersing zone, continuously circulating vaporous effluence from said reaction chamber comprising hydrocarbons containing sublimed aluminum chloride dispersed therein through said restricted zone of fluid flow and said aluminum chloride dispersing zone back into said reaction chamber, thereby continuously dispersing fresh sublimed aluminum chloride into said circulating stream of vaporous reactants, continuously introducing fresh vaporous hydrocarbons to be polymerized into said circuit, continuously withdrawing a portion of said reactants comprising polymerized hydrocarbons and aluminum chloride from said circuit, and separately removing aluminum chloride and hydrocarbons from said withdrawn portion of reactants.

5. In a process for the execution of catalytic reactions in the vapor phase wherein reactants are contacted in the gaseous state with aluminum chloride at reaction conditions in an unpacked reaction chamber, the steps which comprise maintaining a circulating gaseous stream of said reactants containing sublimed aluminum chloride uniformly dispersed therein in a substantially closed circuit, said circuit comprising said unpacked reaction chamber in communication by means of a restricted zone of fluid flow in a confined stream with an aluminum chloride dispersing zone, continuously subliming solid aluminum chloride out of contact with said reactants, introducing said sublimed aluminum chloride into said aluminum chloride dispersing zone, continuously circulating effluence from said reaction chamber comprising gaseous reactants containing sublimed aluminum chloride dispersed therein through said restricted zone of fluid flow and said aluminum chloride dispersing zone back into said reaction chamber, thereby continuously dispersing fresh sublimed aluminum chloride into said circulating stream of reactants, continuously introducing fresh gaseous reactants into said circuit, continuously withdrawing a portion of said reactants comprising aluminum chloride from said circuit, and separately removing aluminum chloride and reactants from said withdrawn portion of reactants.

ADAM DYDUSZYNSKI.

REFERENCES CITED

The following references are of record in the file of this patent:

UNITED STATES PATENTS

| Number | Name | Date |
| --- | --- | --- |
| 2,085,524 | De Simo et al. | June 30, 1937 |
| 2,139,038 | Russell | Dec. 6, 1938 |
| 2,277,022 | McMillan et al. | Mar. 17, 1942 |